May 29, 1973 J. C. MARTIN 3,736,155
COLD WATER POUR-IN BEVERAGE MAKER WITH BLANKET
HEATER AND BIMETALLIC THERMOSTAT
Filed May 15, 1972 2 Sheets-Sheet 1
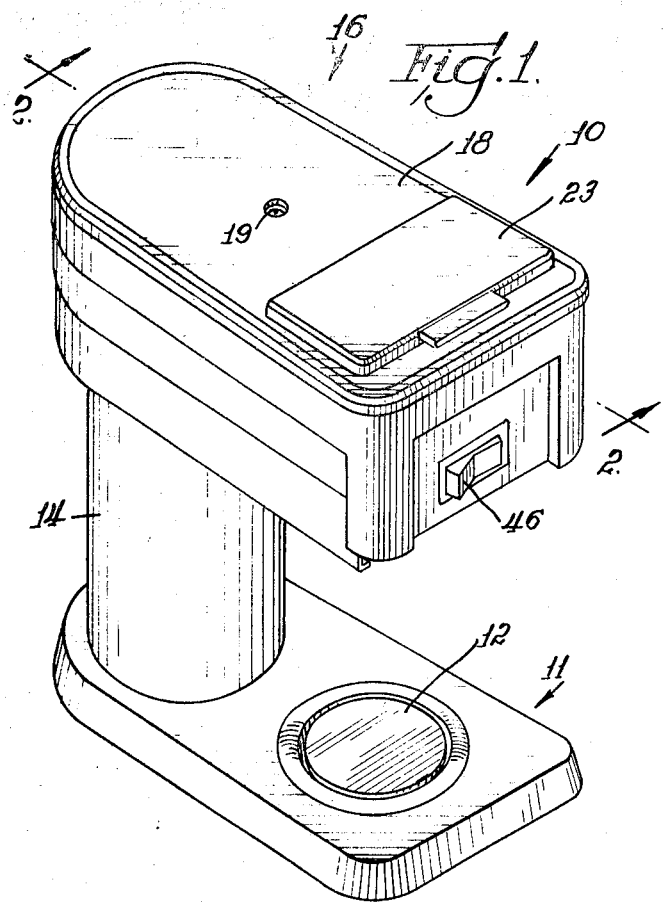
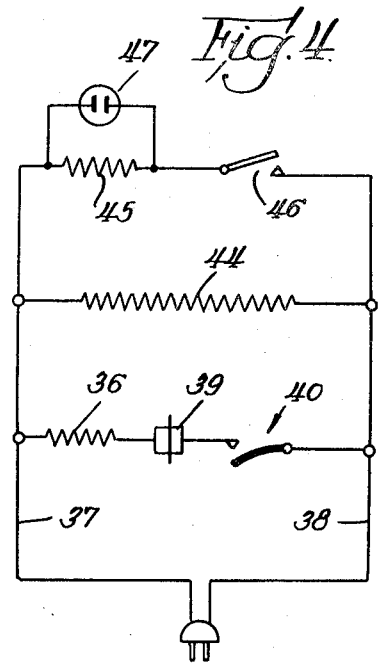
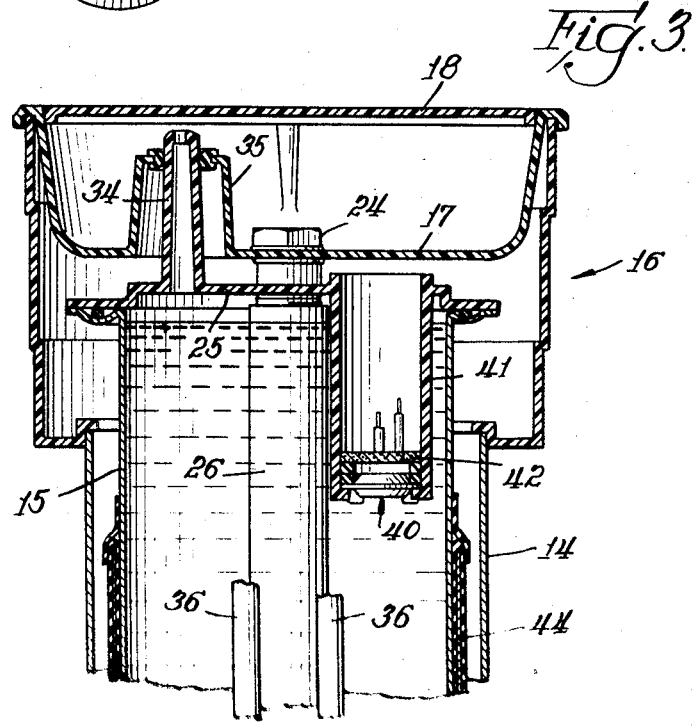

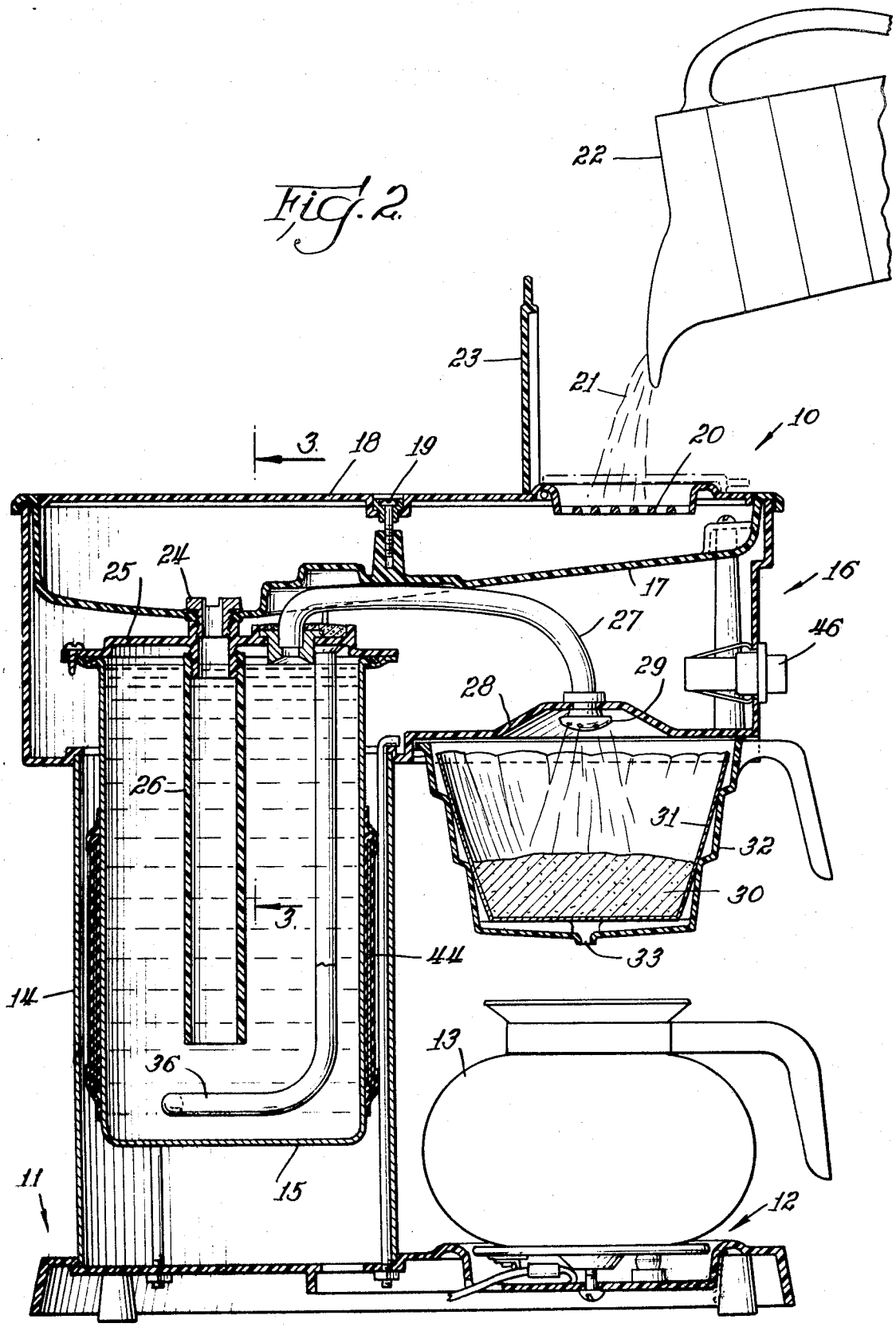

3,736,155
COLD WATER POUR-IN BEVERAGE MAKER WITH BLANKET HEATER AND DIMETALLIC THERMOSTAT
John C. Martin, Springfield, Ill., assignor to Bunn-O-Matic Corporation, Springfield, Ill.
Filed May 15, 1972, Ser. No. 253,556
Int. Cl. A47j 31/00
U.S. Cl. 99—282                         5 Claims

ABSTRACT OF THE DISCLOSURE

Water is heated in a tank under the control of a bimetallic thermostat which has a wide temperature operating range. Normal heat loss is made up by a blanket heater that maintains the water at a temperature intermediate the range of the bimetallic thermostat.

---

This invention is an improvement over the construction disclosed in U.S. Pat. No. 3,385,201, issued May 28, 1968.

Among the objects of this invention are: To provide for maintaining the temperature of water in a tank in a cold water pour-in beverage maker through the joint actions of a bimetallic thermostat and a blanket tank heater; to locate the bimetallic thermostat in the bottom of a tube that extends into the upper end of the tank and below the normal level of the water therein; and to arrange for the bimetallic thermostat to connect an electric heater immersed in the water in the tank for energization at a water temperature of about 180° F. and to disconnect it at a temperature of about 200° F. while the blanket tank heater tends to maintain the temperature of the water at about 195° F.

In the drawings:

FIG. 1 is a perspective view of a cold water pour-in type of coffee maker in which this invention is embodied.

FIG. 2 is a vertical sectional view taken generally along line 2—2 of FIG. 1 and at an enlarged scale.

FIG. 3 is a vertical sectional view taken generally along line 3—3 of FIG. 2.

FIG. 4 shows diagrammatically the circuit connections that can be employed for the coffee maker.

Referring now particularly to FIGS. 1 and 3 it will be observed that the reference character 10 designates, generally, a cold water pour-in type of coffee maker that is similar in many respects to the coffee maker described in the patent above referred to. The coffee maker 10 is provided with a base 11 which carries a warmer 12 on which a beaker 13 can be positioned. The base 11 is provided with an upstanding cylindrical housing 14 which has mounted therein a metallic or plastic water tank 15. The water tank 15 extends into a horizontal upper housing 16 which overlies the base 11 and contains a basin 17. A cover 18 overlies the basin 17 and is secured thereto by a screw 19. The cover 18 is provided with a grill 20 through which cold water 21 can be poured from a pitcher 22 when a hinger cover 23 is shifted to the position shown in FIG. 2. The cold water in the basin 17 flows through a hollow hexagonal nut 24 which secures the basin 17 to a tank cover 25 that may be formed of suitable plastic. The basin 17 and cover 18 are also formed of suitable plastic. The cold water flows through the hollow hexagonal nut 24 and through an inlet water line or tube 26 to the lower end of the metallic tank 15. It will be observed that the inlet water line or tube 26 is threaded unto a suitable externally threaded portion of the tank cover 25.

When cold water flows into the lower portion of the tank 15 hot water at the upper end is displaced and is siphoned out through a discharge water line 27 one end of which opens into the upper end of the tank 15 through the cover 25. The discharge water line 27 extends underneath the basin 17 and through a floor 28 of the upper housing 16 where it terminates in a spray nozzle 29. Hot water from the spray nozzle 29 is distributed over ground coffee 30 that is positioned on a filter 31 in a funnel 32. Coffee extract flows through an aperture 33 in the bottom of the funnel 32 to the beaker 13 which is maintained at an elevated temperature by the warmer 12. The siphon action is provided by a vent tube 34 which is molded integrally with the tank cover 25, FIG. 3, and extends through an upstanding sleeve 35 that is formed integrally with the floor of the basin 17. The vent tube 34 places the water tank 15 in direct communication with the atmosphere so that atmospheric pressure is available to siphon the hot water out of the tank 15 through the discharge water line 27 and to the spray nozzle 29. The amount of hot water that is siphoned out depends upon the amount of cold water 21 that is poured into the basin 17.

In order to heat the water in the tank 15 to the desired temperature for brewing coffee or for other purposes an electric tank heater 36 of the immersion type is suitably mounted within the water tank 15. As shown in FIG. 4 the electric tank heater 36 is connected for energization between conductors 37 and 38 which are arranged to be connected to a 115 v. 60 Hz. source. The connection to the conductors 37 and 38 is through a limit circuit breaker 39 and a bimetallic thermostat that is indicated, generally, at 40. The bimetallic thermostat 40 is arranged to operate over a relatively wide temperature range. For example, it is arranged to complete the energizing circuit for the electric tank heater 36 when the temperature of the water in the tank 15 falls to 180° F. The electric tank heater 36 continues to be energized until the temperature of the water in the tank 15 reaches about 200° F.

Preferably the bimetallic thermostat 40, as shown in FIG. 3, is located at the lower end of a tube 41 that is formed integrally with the tank cover 25. The bimetallic thermostat 40 is suitably sealed to the lower end of the tube 41 by sealing compound indicated at 42.

The limit circuit breaker 39 is located in a suitable position in the tank cover 25 and is arranged to be opened automatically only in the event that the bimetallic thermostat 40 should remain in the closed position and steam should be generated in the upper end of the tank 15. Preferably the limit circuit breaker is of the manually resettable type.

With a view to off setting non-use period heat losses from the tank 15 a blanket electric heater 44 is employed. As shown in FIG. 2, the blanket electric heater 44 surrounds the lower portion of the tank 15. It is shown diagrammatically in FIG. 4 where it is connected continuously between the conductors 37 and 38. The blanket electric heater 44 is capable under normal operating conditions with no water being discharged from the tank 15 and after it has been heated to operating temperature by the electric tank heater 36 to maintain the temperature of the water at about 195° F. As compared to the electric tank heater 36 the blanket electric heater 44 is of the relatively low wattage type. However, it obviates the necessity for repeated closing and opening of the contacts of the bimetallic thermostat 40.

As shown in FIG. 4 an electric heating element 45 is provided for the warmer 12 and is arranged to be connected between the conductors 37 and 38 on operation of a switch 46 which is located at the front end of the upper housing 16, FIG. 2. An indicator neon lamp 47 is connected across the element 45 to show that it is energized when the switch 46 is closed.

I claim:

1. A machine for heating water for making varying amounts of coffee extract and for other purposes comprising: a water tank, an electric tank heater in said tank, a blanket electric heater surrounding said tank and connected to a source of electric current, discharge means in spaced relation to said water tank, a discharge water line interconnecting said water tank and said discharge means, means underneath said discharge means for receiving hot water therefrom, hood means enclosing the upper end of said water tank and said discharge water line, an inlet water line for said water tank opening upwardly through said hood means, a cold water receiving basin connected at its bottom to said inlet water line, and a bimetallic temperature sensing thermostat below the normal level of water in said tank for connecting and disconnecting said tank heater to said source of electric current, said bimetallic temperature sensing thermostat being characterized by being operable over a relatively wide temperature range, said blanket electric heater being characterized by being capable of maintaining the water in said tank at a temperature intermediate said wide temperature range.

2. A machine according to claim 1 wherein said relatively wide temperature range is from about 180° F. to about 200° F. and said temperature is about 195° F.

3. A machine according to claim 1 wherein said bimetallic temperature sensing thermostat is located at the bottom of a tube extending into the upper end of said tank.

4. A machine for heating water for making varying amounts of coffee extract and for other purposes comprising: a water tank, an electric tank heater in said tank, discharge means in spaced relation to said water tank, a discharge water line interconnecting said water tank and said discharge means, means underneath said discharge means for receiving hot water therefrom, hood means enclosing the upper end of said water tank and said discharge water line, an inlet water line for said water tank opening upwardly through said hood means, a cold water receiving basin connected at its bottom to said inlet water line, a tube extending into the upper end of said tank along side of said inlet water line, and a bimetallic temperature sensing thermostat at the bottom of and sealed to said tube for normally connecting and disconnecting said tank heater to a source of electric current.

5. A machine according to claim 4 wherein a blanket electric heater surrounds said tank and is connected to said said source of electric current.

References Cited

UNITED STATES PATENTS

| | | | |
|---|---|---|---|
| 2,752,123 | 6/1956 | Deuschel | 219—311 X |
| 3,220,334 | 11/1965 | Martin | 99—282 |
| 3,347,151 | 10/1967 | Ronalds | 99—281 |
| 3,385,201 | 5/1968 | Martin | 99—282 |

ROBERT W. JENKINS, Primary Examiner

U.S. Cl. X.R.

219—311